United States Patent
Miyauchi et al.

(10) Patent No.: US 7,809,396 B2
(45) Date of Patent: Oct. 5, 2010

(54) MOBILE TELEPHONE, TRANSMISSION POWER CONTROL METHOD, AND PROGRAM

(75) Inventors: Seita Miyauchi, Higashiosaka (JP); Kosuke Nagase, Ichinomiya (JP); Tetsuyuki Taniguchi, Daito (JP); Seiji Nanitani, Amagasaki (JP)

(73) Assignee: Kyocera Corporation, Kyoto (JP)

( * ) Notice: Subject to any disclaimer, the term of this patent is extended or adjusted under 35 U.S.C. 154(b) by 324 days.

(21) Appl. No.: 11/791,955

(22) PCT Filed: Nov. 24, 2005

(86) PCT No.: PCT/JP2005/021595

§ 371 (c)(1),
(2), (4) Date: Apr. 14, 2008

(87) PCT Pub. No.: WO2006/059533

PCT Pub. Date: Jun. 8, 2006

(65) Prior Publication Data

US 2008/0268915 A1   Oct. 30, 2008

(30) Foreign Application Priority Data

Dec. 1, 2004 (JP) .............................. 2004-348606

(51) Int. Cl.
*H04B 7/00* (2006.01)
*H04Q 7/20* (2006.01)

(52) U.S. Cl. .................... 455/522; 455/572; 455/127.1; 455/343.1

(58) Field of Classification Search ................. 455/572, 455/127.1, 127.2, 126, 69, 522, 573, 574, 455/343.1, 343.2, 343.5
See application file for complete search history.

(56) References Cited

U.S. PATENT DOCUMENTS

| 6,282,411 | B2 * | 8/2001 | Higuchi | 455/127.1 |
| 7,184,722 | B1 * | 2/2007 | Johnson et al. | 455/127.1 |
| 2001/0012766 | A1 * | 8/2001 | Ichikawa | 455/69 |
| 2003/0045257 | A1 | 3/2003 | Kobayashi et al. | |

FOREIGN PATENT DOCUMENTS

| JP | 7-235902 | 9/1995 |
| JP | 2000-278148 | 10/2000 |
| JP | 2001-339317 | 12/2001 |
| JP | 2002-50971 | 2/2002 |
| JP | 2002-353822 | 12/2002 |
| JP | 2003-243995 | 8/2003 |

\* cited by examiner

*Primary Examiner*—John Lee
(74) *Attorney, Agent, or Firm*—Morrison & Foerster LLP (57) ABSTRACT

The present invention provides a mobile phone having a control mechanism for controlling transmission power according to changes in various environmental conditions. A mobile phone for performing transmission at a transmission frequency of an assigned channel, the mobile phone comprising: a temperature detecting unit operable to detect a temperature in the mobile phone; a correction value specifying unit operable to specify a correction value for correcting transmission power, according to the temperature detected by the temperature detecting unit and the transmission frequency; and a control unit operable to control the transmission power based on the correction value specified by the correction value specifying unit.

7 Claims, 6 Drawing Sheets

| TEMPERATURE BLOCK \ FREQUENCY BLOCK | F0 | F1 | F2 | F3 | ... | F13 | F14 | F15 |
|---|---|---|---|---|---|---|---|---|
| LOW-TEMPERATURE BLOCK [−30° C~10° C] | $C_{L0}$ | $C_{L1}$ | $C_{L2}$ | $C_{L3}$ | ... | $C_{L13}$ | $C_{L14}$ | $C_{L15}$ |
| HIGH-TEMPERATURE BLOCK [30° C~60° C] | $C_{H0}$ | $C_{H1}$ | $C_{H2}$ | $C_{H3}$ | ... | $C_{H13}$ | $C_{H14}$ | $C_{H15}$ |

FIG. 2B

| TEMPERATURE BLOCK \ FREQUENCY BLOCK | F0 | F1 | F2 | F3 | ... | F13 | F14 | F15 |
|---|---|---|---|---|---|---|---|---|
| LOW-TEMPERATURE BLOCK [−30° C~10° C] | 23.5 | 23.5 | 23.5 | 23.5 | ... | 23.2 | 23.1 | 23.0 |
| HIGH-TEMPERATURE BLOCK [30° C~60° C] | 23.5 | 23.5 | 23.5 | 23.5 | ... | 23.8 | 23.8 | 23.9 |

[UNIT : dBm]

| FREQUENCY BLOCK<br>TEMPERATURE SAMPLE | F0 | F1 | F2 | F3 | ... | F13 | F14 | F15 |
|---|---|---|---|---|---|---|---|---|
| TEMPERATURE SAMPLE T1 [−30° C] | $C_{10}$ | $C_{11}$ | $C_{12}$ | $C_{13}$ | ... | $C_{113}$ | $C_{114}$ | $C_{115}$ |
| TEMPERATURE SAMPLE T2 [10° C] | $C_{20}$ | $C_{21}$ | $C_{22}$ | $C_{23}$ | ... | $C_{213}$ | $C_{214}$ | $C_{215}$ |
| TEMPERATURE SAMPLE T3 [30° C] | $C_{30}$ | $C_{31}$ | $C_{32}$ | $C_{33}$ | ... | $C_{313}$ | $C_{314}$ | $C_{315}$ |
| TEMPERATURE SAMPLE T4 [60° C] | $C_{40}$ | $C_{41}$ | $C_{42}$ | $C_{43}$ | ... | $C_{413}$ | $C_{414}$ | $C_{415}$ |

FIG. 5B

| FREQUENCY BLOCK<br>TEMPERATURE SAMPLE | F0 | F1 | F2 | F3 | ... | F13 | F14 | F15 |
|---|---|---|---|---|---|---|---|---|
| TEMPERATURE SAMPLE T1 [−30° C] | 0 | 0 | 0 | −0.1 | ... | −0.7 | −0.8 | −0.9 |
| TEMPERATURE SAMPLE T2 [10° C] | 0 | 0 | 0 | 0 | ... | 0 | 0 | 0 |
| TEMPERATURE SAMPLE T3 [30° C] | 0 | 0 | 0 | 0 | ... | 0 | 0 | 0 |
| TEMPERATURE SAMPLE T4 [60° C] | 0 | 0 | 0 | 0.1 | ... | 0.8 | 0.8 | 0.9 |

FIG. 6

MOBILE TELEPHONE, TRANSMISSION POWER CONTROL METHOD, AND PROGRAM

TECHNICAL FIELD

The present invention relates to a technology for correcting transmission power of a mobile phone.

BACKGROUND ART

Transmission power of a mobile phone varies according to changes in various environmental conditions. Therefore, a mobile phone is required to have a mechanism for keeping transmission power constant.

For example, a patent document 1 discloses a technology for correcting transmission power according to a frequency.
Patent Document 1: Japanese Published Patent Application No. H07-235902

DISCLOSURE OF THE INVENTION

Problems the Invention is Going to Solve

However, transmission power of a mobile phone varies according to not only a frequency change but also other factors. Therefore, keeping transmission power constant has been difficult only by controlling transmission power according to a frequency change as disclosed in the patent document 1.

In view of this, a main object of the present invention is to provide a mobile phone having a control mechanism for controlling transmission power according to changes in various environmental conditions, a transmission power control method and a program used for the mobile phone.

Means of Solving the Problems

The above-mentioned object can be achieved by a mobile phone for performing transmission at a transmission frequency of an assigned channel, the mobile phone comprising: a temperature detecting unit operable to detect a temperature in the mobile phone; a correction value specifying unit operable to specify a correction value for correcting transmission power, according to the temperature detected by the temperature detecting unit and the transmission frequency; and a control unit operable to control the transmission power based on the correction value specified by the correction value specifying unit.

Also, a transmission power control method used for a mobile phone for performing transmission at a transmission frequency of an assigned channel, the transmission power control method comprises: a temperature specifying step of specifying a temperature in the mobile phone detected by a temperature sensor; a correction value specifying step of specifying a correction value for correcting transmission power, according to the temperature specified by the temperature specifying step and the transmission frequency; and a control step of outputting a signal for controlling the transmission power based on the correction value specified by the correction value specifying step.

Moreover, a program for causing a mobile phone for performing transmission at a transmission frequency of an assigned channel, to control transmission power, the program comprises: a temperature specifying step of specifying a temperature in the mobile phone detected by a temperature sensor; a correction value specifying step of specifying a correction value for correcting transmission power, according to the temperature specified by the temperature specifying step and the transmission frequency; and a control step of outputting a signal for controlling the transmission power based on the correction value specified by the correction value specifying step.

Effects of the Invention

In a mobile phone with the above-stated construction, a mobile phone using the above-stated transmission power control method, and a mobile phone in which the above-stated program is installed, transmission power can be controlled by a correction value according to a detected temperature and a transmission frequency. Therefore, for example, a mobile phone available for an international roaming service can correct transmission power to keep it constant, according to climatic conditions and channel frequencies which differ among countries.

Furthermore, the mobile phone further comprises: a storing unit operable to store temperature ranges, frequency ranges, and values in a one-to-one correspondence with each other, wherein the correction value specifying unit specifies a value stored in the storing unit as the correction value, the value corresponding to a temperature range to which the detected temperature belongs and a frequency range to which the transmission frequency belongs.

With the above-stated construction, a correction value can be specified without performing a complicated operation.

Also, the mobile phone further comprises: a storing unit operable to store, for each frequency range, at least two combinations of temperatures and values, wherein the correction value specifying unit reads, from the storing unit, two combinations that are closer to the detected temperature for a frequency range to which the transmission frequency belongs, carries out a linear interpolation operation using two temperatures and two values in the read two combinations, and specifies a result of the operation as the correction value.

Moreover, the mobile phone further comprises: a storing unit operable to store at least two combinations of frequencies, temperatures, and values, wherein the correction value specifying unit carries out an interpolation operation using the values in the at least two combinations stored in the storing unit, and specifies a result of the operation as the correction value. Furthermore, the correction value specifying unit includes: a selecting unit operable to select two combinations that are closer to the detected temperature and the transmission frequency, out of the at least two combinations stored in the storing unit; and a linear interpolation operation unit operable to calculate the correction value corresponding to the detected temperature and the transmission frequency, by carrying out a linear interpolation operation using two temperatures and two values in the selected two combinations.

With the above-stated construction, a number of correction values corresponding to all frequencies and temperatures are not required to memorize. Also, only by storing some discrete values, a correction value can be calculated by an interpolation operation using the discrete values. Therefore, a memory amount can be saved.

Also, the mobile phone further comprises: a mathematical formula storing unit operable to store a mathematical formula which specifies one correction value corresponding to a temperature variable and a frequency variable, wherein the correction value specifying unit carries out an operation by assigning the detected temperature and the transmission frequency to the mathematical formula, and specifies a result of the operation as the correction value.

With the above-stated construction, a frequency, a temperature, and a correction value are not required to memorize so as to correspond to each other, and a correction value can be specified only by assigning a detected temperature and a transmission frequency to a mathematical formula. A mathematical formula can exhibit a transmission power characteristic according to a frequency change and a temperature change with high accuracy, and can perform a more stable correction.

DESCRIPTION OF REFERENCE NUMERALS

10: antenna
20: duplexer
30: receiving unit
31: low-noise amplifier
33: RF filter
35: receiving mixer
40: transmitting unit
41: driver amplifier
43: RF filter
45: power amplifier
47: isolator
50: frequency synthesizer
60: baseband processing unit
61: received signal processing circuit
62: transmitted signal processing circuit
63: temperature specifying unit
65: frequency setting unit
67: power setting unit
69: correction table
70: receiver
80: transmitter
90: temperature sensor
100: mobile phone

BEST MODE FOR CARRYING OUT THE INVENTION

The following describes embodiments of the present invention, with reference to the attached drawings.

First Embodiment

Figure 1:
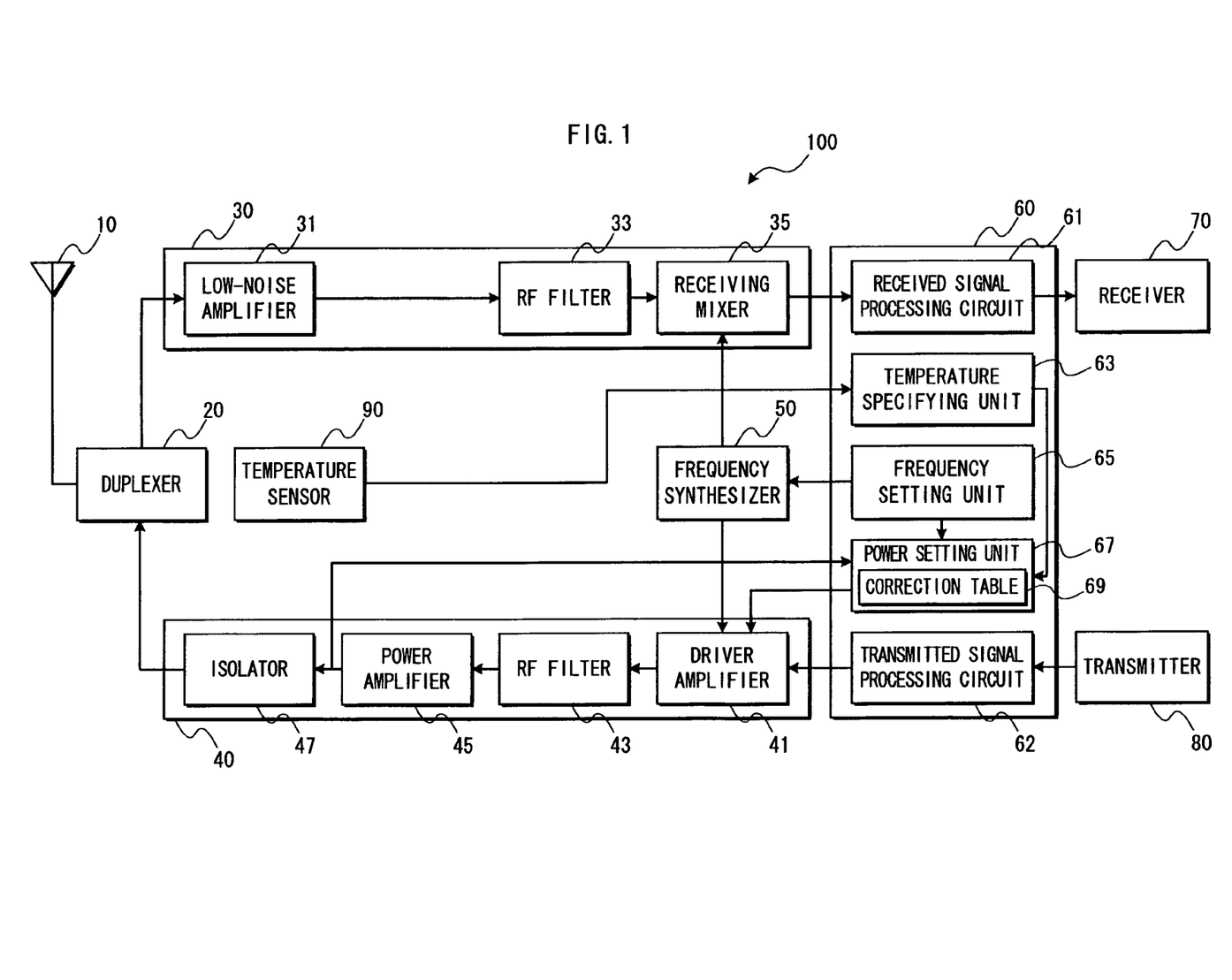
FIG. 1 is a block diagram showing a construction of a mobile phone of a first embodiment.

FIG. 1 is a block diagram showing a construction of a mobile phone of a first embodiment.

In FIG. 1, a mobile phone 100 includes an antenna 10, a duplexer 20 for switching a transmitting connection path and a receiving connection path, a receiving unit 30, a transmitting unit 40, a frequency synthesizer 50, a baseband (BB) processing unit 60, a receiver 70, a transmitter 80, and a temperature sensor 90.

The receiving unit 30 includes a low-noise amplifier 31 for amplifying a signal inputted from the antenna 10, an RF filter 33 for eliminating a frequency component of an unnecessary band, and a receiving mixer 35 for converting from a radio-frequency signal to an IF signal and demodulating an IF signal.

The transmitting unit 40 includes a driver amplifier 41, an RF filter 43 for extracting a desired frequency component, a power amplifier 45 for amplifying a signal, and an isolator 47.

The driver amplifier 41 includes a modulator for modulating a transmitted signal, a mixer for converting an output of the modulator into a radio frequency signal by mixing the output with a signal oscillated by the frequency synthesizer 50, a driver amplifier for adjusting transmission power according to a control signal from the baseband processing unit 60 (a power setting unit 67), and the like.

The temperature sensor 90 is arranged between the receiving unit 30 and the transmitting unit 40.

The temperature sensor 90 includes a thermistor having an electric resistance which changes according to a temperature change. The temperature sensor 90 converts a resistance value of the thermistor corresponding to an ambient temperature in a location of the temperature sensor 90, into a signal indicating the temperature (hereinafter, referred to as a "temperature signal"), and outputs the signal to a temperature specifying unit 63. Although the temperature sensor 90 includes the thermistor in the first embodiment, the present invention is not limited to a thermistor, and other temperature-measuring devices such as a temperature sensor IC and the like may be used.

The baseband processing unit 60 includes a received signal processing circuit 61 for performing a baseband process on a received signal between the receiving unit 30 and the receiver 70, and a transmitted signal processing circuit 62 for performing a baseband process on a transmitted signal between the transmitting unit 40 and the transmitter 80.

Also, the baseband processing unit 60 includes the temperature specifying unit 63, a frequency setting unit 65, and the power setting unit 67, as a characteristic construction of the first embodiment. This construction enables the mobile phone 100 to correct transmission power according to a temperature indicated by the temperature sensor 90 and a transmission frequency, and output stable transmission power.

The temperature specifying unit 63 obtains a temperature signal from the temperature sensor 90 and compares the temperature signal with a boundary value of each temperature block to specify to which temperature block an ambient temperature indicated by the temperature signal belongs. The temperature specifying unit 63 then notifies the power setting unit 67 of the specified temperature block. In the first embodiment, there are two temperature blocks, i.e. a low-temperature block in a range of −30° C. to 10° C. inclusive, and a high-temperature block in a range of 30° C. to 60° C. inclusive. When comparing a temperature signal with a boundary value, hardware such as a comparator, or a program for a comparison which has been stored in advance may be used. The temperature specifying unit 63 obtains a latest temperature signal at a predetermined interval such as every minute and specifies one of the temperature blocks.

Note that in the first embodiment, there is no temperature block in a range of 10° C. to 30° C., which is between the low-temperature block and the high-temperature block. The reason is that no correction is required because a transmission power distortion in this normal temperature range is extremely small. Therefore, the temperature specifying unit 63 transmits a signal indicating that a correction is not required, to the power setting unit 67, if the ambient temperature indicated by the temperature signal is in a range of 10° C. to 30° C.

The frequency setting unit 65 notifies the frequency synthesizer 50 of a frequency in order to cause the frequency synthesizer 50 to oscillate each frequency according to an uplink channel and a downlink channel used for transmission and reception with a base station. Also, the frequency setting unit 65 specifies to which frequency block a transmission frequency in the uplink channel belongs, and notifies the power setting unit 67 of the specified frequency block. In the first embodiment, there are 16 frequency blocks made by dividing a transmission frequency band of the mobile phone 100 into 16 small bands each having a different frequency. Each frequency block is called F0, F1, F2, F3, F4, ..., F14, and F15 in an order of ascending a frequency band.

The power setting unit 67 obtains the temperature block specified by the temperature specifying unit 63, and the frequency block specified by the frequency setting unit 65. Then, the power setting unit 67 specifies a correction value corresponding to the temperature block and the frequency block by referring to a correction table 69, and notifies the driver amplifier 41 of a control signal according to the correction value to control transmission power to be outputted by the driver amplifier 41.

The correction table 69 stores a correction value corresponding to a combination of each temperature block and frequency block.

Figure 2A:
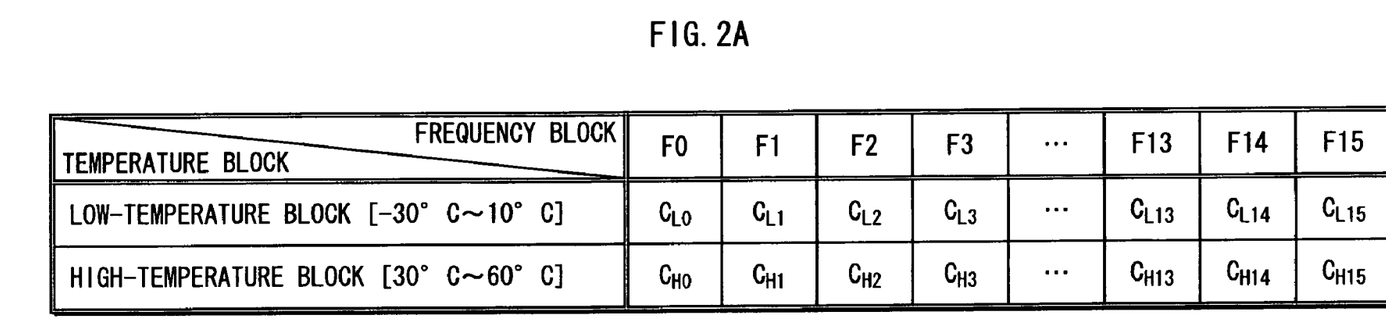
FIG. 2A shows a data structure of a correction table 69 of the first embodiment.

FIG. 2A shows a data structure of the correction table 69.

As shown in FIG. 2A, the temperature blocks are indicated in rows, and the frequency blocks are indicated in columns. A value in an intersection of a row of a temperature block and a column of a frequency block is a correction value corresponding to a combination of the temperature block and the frequency block.

For example, a correction value corresponding to a combination of the low-temperature block and a frequency block F13 is CL13. Also, a correction value corresponding to a combination of the high-temperature block and a frequency block F14 is CH14.

In FIG. 2A, a correction value is expressed in a symbol such as CL13, CH14, and the like for an illustrative purpose. However, in fact, numeric data indicating a correction value is recorded.

Figure 2B:
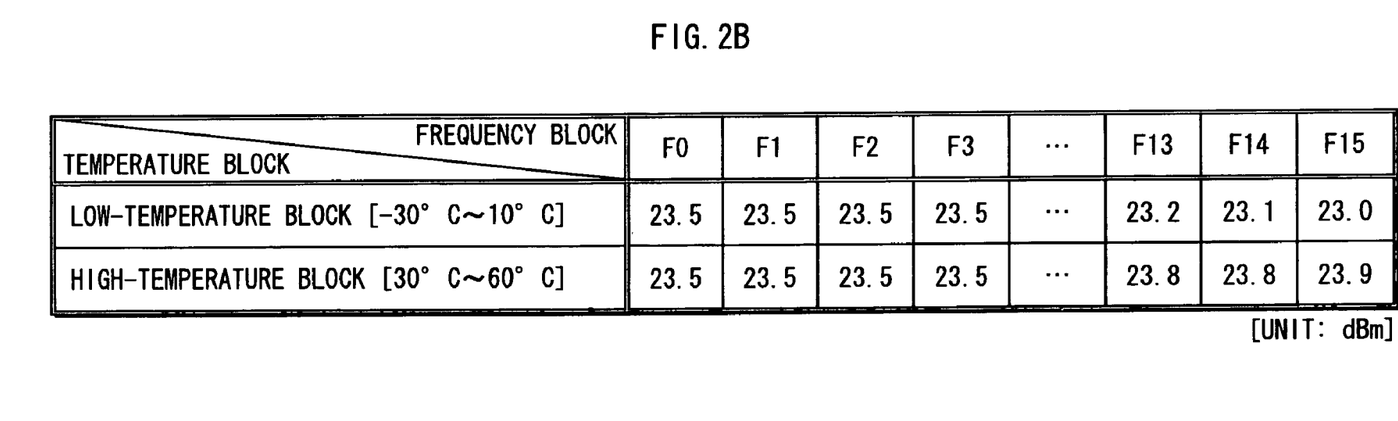
FIG. 2B shows an example of numeric data stored in the correction table 69.

FIG. 2B shows an example of the numeric data stored in the correction table 69.

For example, the correction value corresponding to the combination of the low-temperature block and the frequency block F13 is 23.2 dBm. Also, the correction value corresponding to the combination of the high-temperature block and the frequency block F14 is 23.8 dBm.

When a temperature block specified by the temperature specifying unit 63 is the low-temperature block and a frequency block specified by the frequency setting unit 65 is F13, the power setting unit 67 specifies a correction value as 23.2 dBm by referring to the correction table 69 shown in FIG. 2B, and notifies the driver amplifier 41 of a control signal according to the correction value.

When receiving the control signal, the driver amplifier 41 outputs transmission power by adjusting the transmission power to 23.2 dBm.

When a temperature block specified by the temperature specifying unit 63 is the high-temperature block and a frequency block specified by the frequency setting unit 65 is F14, the power setting unit 67 outputs a control signal to the driver amplifier 41 by adjusting transmission power to 23.8 dBm.

In the case of the correction value example shown in FIG. 2B, correction values of both the low-temperature block and the high-temperature block are same in a low frequency block band range. However, in the low-temperature block, the higher a frequency block band is, the lower a correction value is. On the other hand, in the high-temperature block, the higher a frequency block band is, the higher a correction value is.

This is because a change amount of transmission power is different according to a temperature and a frequency.

Figure 3A:
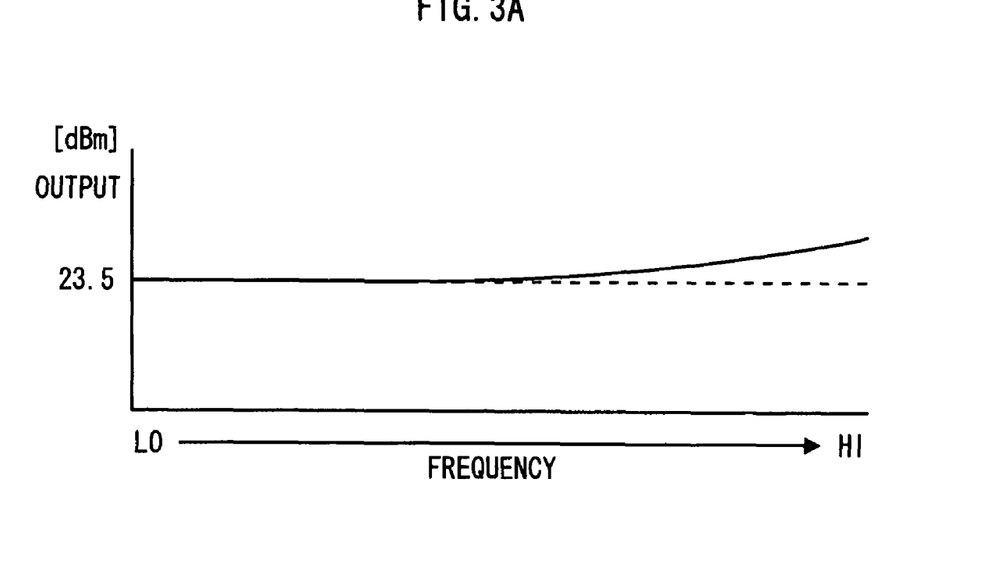
FIG. 3A shows a transmission power characteristic of a low-temperature block of the first embodiment.

FIG. 3A shows a transmission power characteristic in the low-temperature block.

As shown in FIG. 3A, when a temperature around the receiving unit 30 and the transmitting unit 40 is low, the transmission power changes as follows. If the transmission power of the driver amplifier 41 is controlled by setting a target value at 23.5 dBm, transmission power stays constant in a low frequency range. On the other hand, in a high frequency range, the higher a frequency is, the higher the transmission power is, because passband loss attenuation changes in the isolator 47 and the duplexer 20.

As shown in FIG. 2B, in the low-temperature block, in the low frequency range, a correction value is 23.5 dBm which is the target value. On the other hand, in the high frequency range, the higher a frequency is, the lower a correction value is.

Figure 3B:
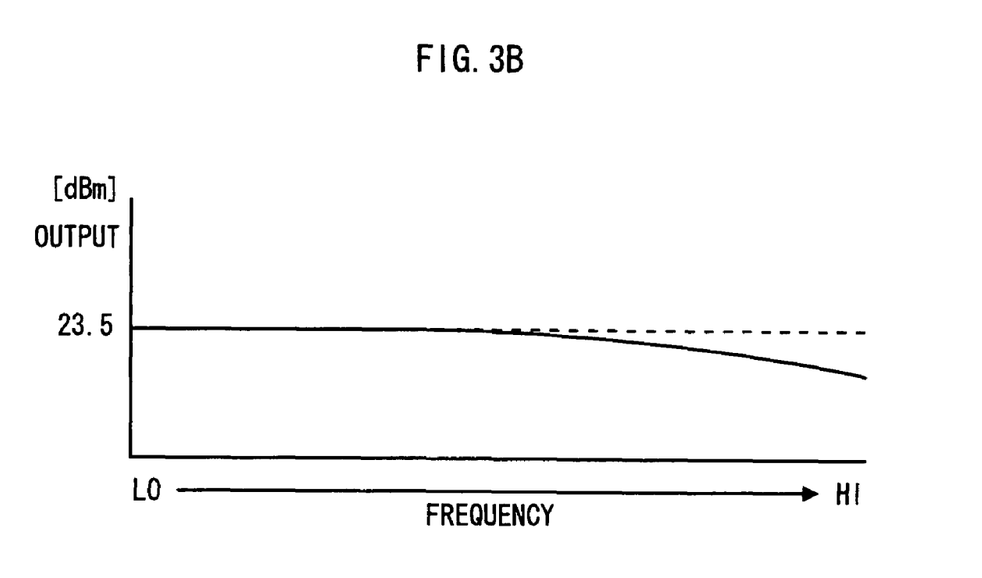
FIG. 3B shows a transmission power characteristic of a high-temperature block.

FIG. 3B shows a transmission power characteristic in the high-temperature block.

As shown in FIG. 3B, when a temperature is high, the transmission power changes as follows. If the transmission power of the driver amplifier 41 is controlled by setting a target value at 23.5 dBm, transmission power stays constant in the low frequency range. On the other hand, in the high frequency range, the higher a frequency is, the lower the transmission power is.

As shown in FIG. 2B, in the high-temperature block, in the low frequency range, a correction value is 23.5 dBm which is the target value. On the other hand, in the high frequency range, the higher a frequency is, the higher a correction value is.

Next, an operation will be described.

Figure 4:
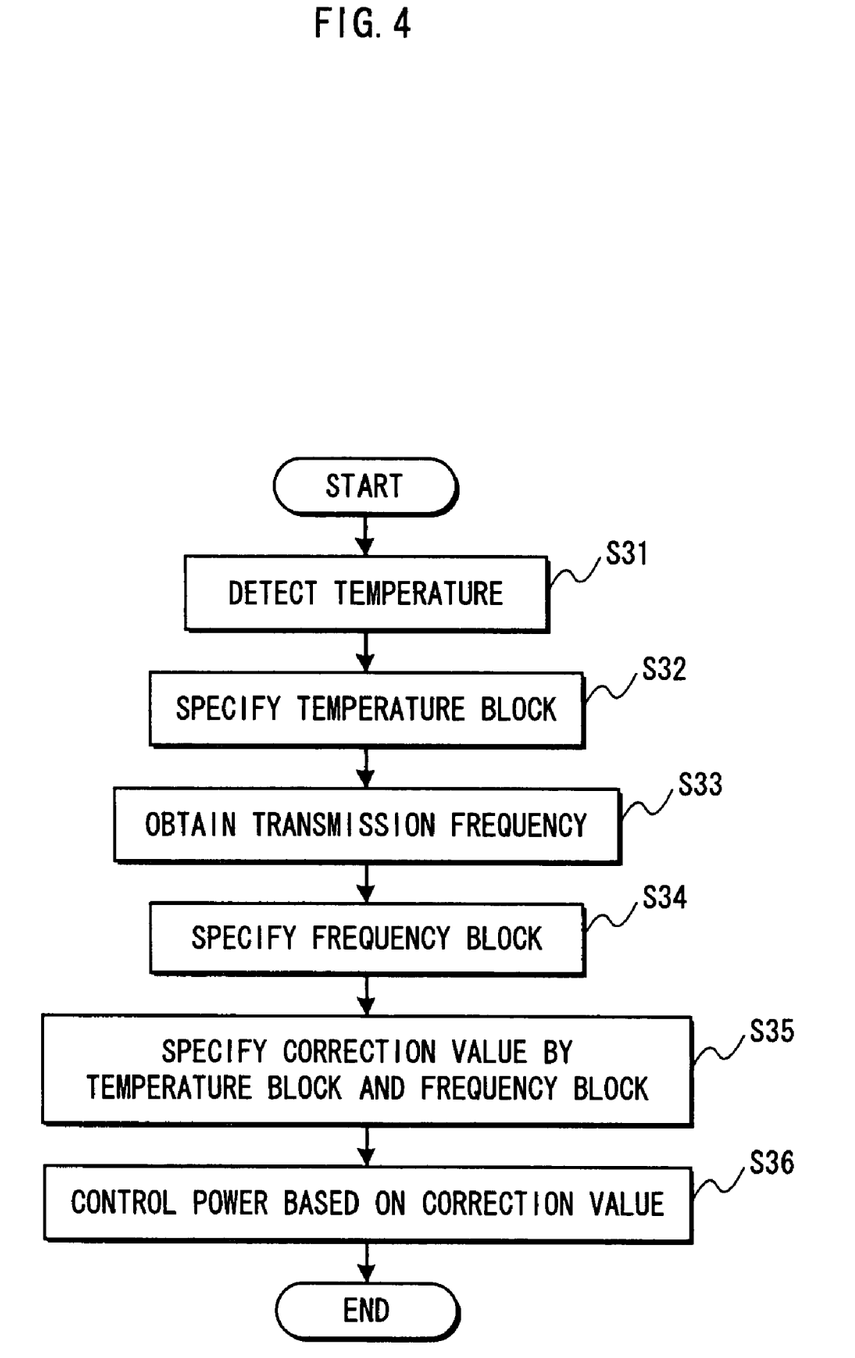
FIG. 4 is a flowchart showing an operation of the first embodiment.

FIG. 4 is a flowchart showing the operation.

When the temperature sensor 90 detects an ambient temperature and notifies the temperature specifying unit 63 of the ambient temperature (step S31), the temperature specifying unit 63 specifies whether the notified ambient temperature belongs to the low-temperature block or the high-temperature block, and notifies the power setting unit 67 of the specified temperature block.

On the other hand, the frequency setting unit 65 obtains a transmission frequency of an uplink channel (step S33), specifies to which frequency block the transmission frequency belongs, and notifies the power setting unit 67 of the specified frequency block (step S34).

The power setting unit 67, which is notified of the temperature block from the temperature specifying unit 63, and the frequency block from the frequency setting unit 65, specifies a correction value corresponding to the temperature block and the frequency block by referring to the correction table 69 (step S35). Then, the power setting unit 67 outputs a control signal according to the correction value to the driver amplifier 41, and causes the driver amplifier 41 to adjust transmission power (step S36).

Second Embodiment

Next, a second embodiment will be described.

The second embodiment differs from the first embodiment in contents of a correction table. Therefore, processes of the components around the correction table in the second embodiment are different from those in the first embodiment. The following describes the components having the different processes from the first embodiment, and the explanations of the components having the same processes as the first embodiment are omitted. Note that with regard to a symbol of each component, the same symbol is used for the same component as FIG. 1.

Figure 5A:
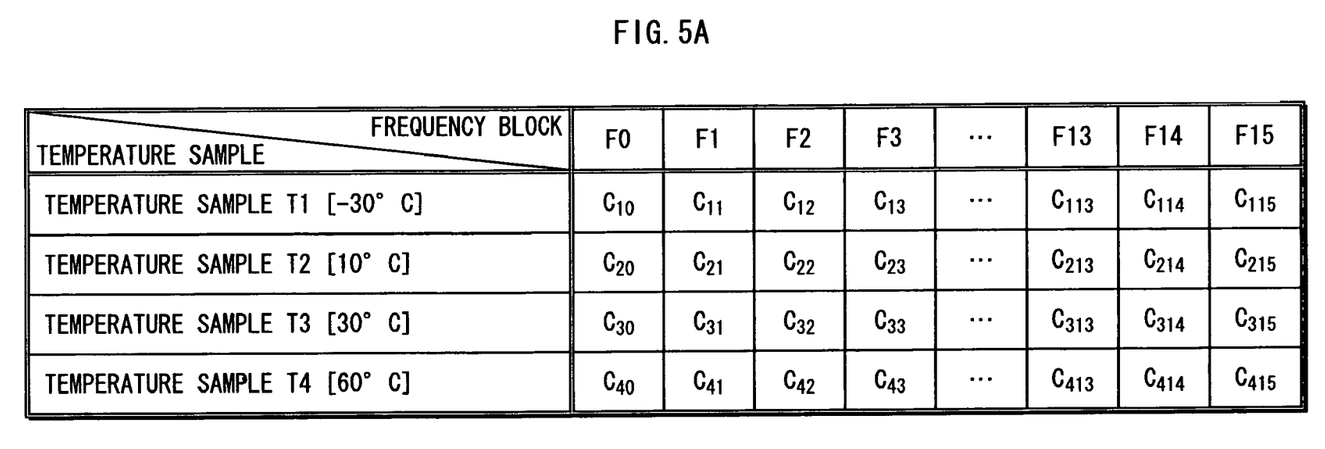
FIG. 5A shows a data structure of the correction table 69 of a second embodiment.

FIG. 5A shows data structure of the correction table 69.

As shown in FIG. 5A, 4 temperature samples are indicated in rows, and 16 frequency blocks are indicated in columns.

In the second embodiment, 4 temperatures are −30° C., 10° C., 30° C., and 60° C. A value in an intersection of a row of a temperature sample and a column of a frequency block is a correction value sample corresponding to a combination of the temperature sample and the frequency block.

For example, a correction value sample corresponding to a combination of a temperature sample T1 and a frequency block F13 is C113. Also, a correction value sample corresponding to a combination of a temperature sample T2 and a frequency block F13 is C213.

Figure 5B:
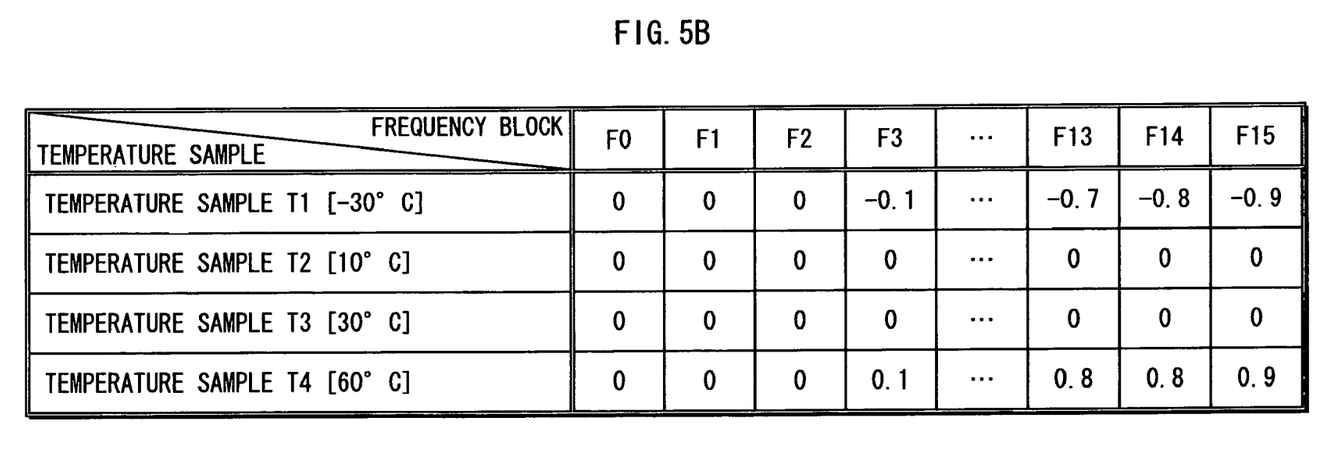
FIG. 5B shows an example of numeric data stored in the correction table 69.

FIG. 5B shows an example of numeric data stored in the correction table 69.

For example, the correction value sample corresponding to the combination of the temperature sample T1 and the frequency block F13 is −0.7. Also, the correction value sample corresponding to the combination of the temperature sample T2 and the frequency block F13 is 0. This correction value sample is not a target value itself of transmission power, unlike the first embodiment. The correction value sample indicates a difference between a target value and a reference value. The driver amplifier 41 receives a control signal indicating the difference from the power setting unit 67, and controls transmission power.

The temperature specifying unit 63 obtains a temperature signal detected by the temperature sensor 90 and compares the temperature signal with each of the 4 temperature sample values to specify between which two of the temperature samples a temperature indicated by the temperature signal is located. Then, the temperature specifying unit 63 notifies the power setting unit 67 of the specified two temperature samples and the temperature signal detected by the temperature sensor 90. For example, when a detected temperature signal indicates −20° C., the temperature is located between the temperature sample of −30° C. and the temperature sample of 10° C. Therefore, the temperature specifying unit 63 notifies the power setting unit 67 of −30° C. and 10° C. as two temperature samples, and −20° C. as a temperature signal. The temperature specifying unit 63 obtains a latest temperature signal at a predetermined interval such as every minute and specifies two temperature samples.

The frequency setting unit 65 has the same construction as the first embodiment. In other words, the frequency setting unit 65 notifies the frequency synthesizer 50 of an oscillated frequency, and specifies a frequency block regarding a transmission frequency.

The power setting unit 67 obtains the two temperature samples and the temperature signal notified by the temperature specifying unit 63, and the frequency block notified by the frequency setting unit 65. After this, the power setting unit 67 specifies two correction value samples corresponding to the frequency block and the two temperature samples, by referring to the correction table 69. Next, the power setting unit 67 calculates a correction value corresponding to the temperature signal detected by the temperature sensor 90, from the two temperature samples and the two correction value samples corresponding to the two temperature samples, using a linear interpolation operation. Then, the power setting unit 67 notifies the driver amplifier 41 of a control signal according to the calculated correction value in order to control transmission power to be outputted by the driver amplifier 41.

As shown in FIG. 5B, when a detected temperature is −20° C. and a frequency block to which a transmission frequency belongs is F13, two temperature samples are −30° C. and 10° C., and two correction value samples corresponding to the two temperature samples are −0.7 and 0. In this case, a correction value is calculated to be −0.35, which is an intermediate value between −0.7 and 0, using a linear interpolation operation. Therefore, the power setting unit 67 notifies the driver amplifier 41 of a control signal so that transmission power is reduced by 0.35 dBm.

Figure 6:
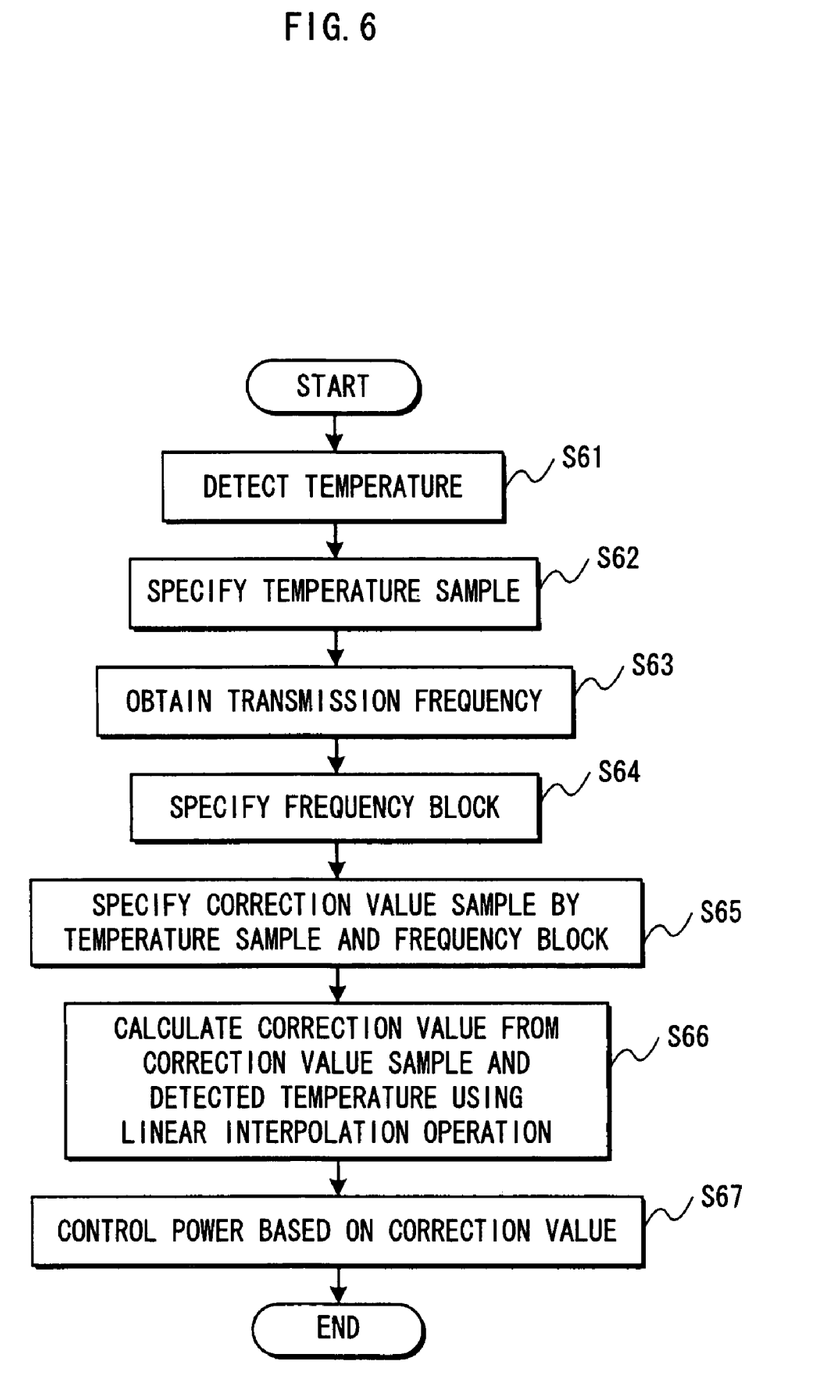
FIG. 6 is a flowchart showing an operation of the second embodiment.

FIG. 6 is a flowchart showing an operation.

When the temperature sensor 90 detects an ambient temperature and notifies the temperature specifying unit 63 of the ambient temperature (step S61), the temperature specifying unit 63 specifies two temperature samples near the notified ambient temperature, and notifies the power setting unit 67 of the detected ambient temperature and the two temperature samples (step S62).

On the other hand, the frequency setting unit 65 obtains a transmission frequency of an uplink channel (step S63), specifies to which frequency block the transmission frequency belongs, and notifies the power setting unit 67 of the specified frequency block (step S64).

The power setting unit 67 specifies two correction values corresponding to the frequency block and the two temperature samples by referring to the correction table 69 (step S65). Then, the power setting unit 67 calculates a correction value corresponding to the detected ambient temperature, from the two temperature samples and the two correction value samples, using a linear interpolation operation (step S66).

Finally, the power setting unit 67 outputs a control signal according to the calculated correction value to the driver amplifier 41, and causes the driver amplifier 41 to adjust transmission power (step S67).

As mentioned above, in the second embodiment, a mobile phone stores a correction value sample corresponding to a temperature sample for each frequency block, and calculates a correction value corresponding a detected temperature using a linear interpolation operation. With this construction, all correction values regarding all frequencies and temperatures are not required to be stored. Therefore, correction values corresponding to all detected temperatures can be calculated by a small amount of memory.

Up to now, the mobile phone of the present invention has been described through the embodiments. However, the present invention is not limited to such embodiments.

(1.) The correction table 69 shown in FIG. 2 has a construction in which a correction value is stored for each frequency block and each temperature block. However, the correction table 69 may have a construction in which a correction value is stored for each frequency and each temperature, not for each frequency block and each temperature block.

(2) As shown in FIG. 2, a frequency block is made by dividing a transmission frequency band into 16 bands. However, the number of divisions is not limited to 16. The same applies to a temperature block.

(3) In FIG. 5, a temperature and a correction value are stored so as to correspond to each other for each frequency block. However, a temperature and a correction value may be stored so as to correspond to each other regarding to a frequency. Then, two combinations of a temperature and a correction value are selected, each of whose frequencies and temperatures are closer to a detected temperature and a transmission frequency. After this, a correction value corresponding to the detected temperature and the transmission frequency can be calculated, from each value of the two combinations using a linear interpolation operation.

Here, the two combinations, each of whose frequencies and temperatures are closer to a detected temperature and a transmission frequency, are selected, and a linear interpolation operation is carried out by using each value of the two combinations. However, a correction value may be calculated by selecting more than three combinations, each of whose frequencies and temperatures are closer to a detected temperature and a transmission frequency, and using each value of more than three combinations.

(4) A correction value may be obtained by storing a mathematical formula instead of the tables shown in FIG. 2 and FIG. 5, which can specify one correction value corresponding to a temperature variable and a frequency variable, and assigning a detected temperature and a transmission frequency to the mathematical formula.

INDUSTRIAL APPLICABILITY

The present invention is useful for a mobile phone which is assumed to be used by moving to various regions in which a climatic condition and a channel frequency are different from each other.

The invention claimed is:

1. A mobile phone for performing transmission at a transmission frequency of an assigned channel, the mobile phone, comprising:
a storing unit operable to store temperature ranges, frequency ranges, and values in a one-to-one correspondence with each other;
a temperature detecting unit operable to detect a temperature in the mobile phone;
a correction value specifying unit operable to specify a value stored in the storing unit as a correction value for correcting transmission power, the value corresponding to a temperature range to which the detected temperature belongs and a frequency range to which the transmission frequency belongs; and
a control unit operable to control the transmission power based on the correction value specified by the correction value specifying unit.

2. The mobile phone of claim 1, wherein the temperature detecting unit is arranged in an intermediate position between a transmitting circuit and a receiving circuit, and detects a temperature of the intermediate position.

3. The mobile phone of claim 2 wherein the temperature detecting unit includes a thermistor.

4. A mobile phone for performing transmission at a transmission frequency of an assigned channel, the mobile phone comprising:
a storing unit operable to store, for each frequency range, at least two combinations of temperatures and values;
a temperature detecting unit operable to detect a temperature in the mobile phone;
a correction value specifying unit operable to read from the storing unit, two combinations that are closer to the detected temperature for a frequency range to which the transmission frequency belongs, carry out a linear interpolation operation using two temperatures and two values in the read two combinations, and specify a result of the operation as a correction value for correcting transmission power; and
a control unit operable to control the transmission power based on the correction value specified by the correction value specifying unit.

5. A mobile phone for performing transmission at a transmission frequency of an assigned channel, the mobile phone comprising:
a storing unit operable to store at least two combinations of frequencies, temperatures, and values;
a temperature detecting unit operable to detect a temperature in the mobile phone;
a correction value specifying unit operable to carry out an interpolation operation using the values in the at least two combinations stored in the storing unit, and specify a result of the operation as a correction value for correcting transmission power; and
a control unit operable to control the transmission power based on the correction value specified by the correction value specifying unit.

6. The mobile phone of claim 5, wherein the correction value specifying unit includes:
a selecting unit operable to select two combinations that are closer to the detected temperature and the transmission frequency, out of the at least two combinations stored in the storing unit; and
a linear interpolation operation unit operable to calculate the correction value corresponding to the detected temperature and the transmission frequency, by carrying out a linear interpolation operation using two temperatures and two values in the selected two combinations.

7. A mobile phone for performing transmission at a transmission frequency of an assigned channel, the mobile phone comprising:
a mathematical formula storing unit operable to store a mathematical formula which specifies one correction value corresponding to a temperature variable and a frequency variable;
a temperature detecting unit operable to detect a temperature in the mobile phone;
a correction value specifying unit operable to carry out an operation by assigning the detected temperature and the transmission frequency to the mathematical formula, and specify a result of the operation as a correction value for correcting transmission power; and
a control unit operable to control the transmission power based on the correction value specified by the correction value specifying unit.

* * * * *